United States Patent
Takeda

(10) Patent No.: US 7,760,591 B2
(45) Date of Patent: Jul. 20, 2010

(54) OPTICAL DISC REPRODUCING APPARATUS

(75) Inventor: Futoshi Takeda, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 452 days.

(21) Appl. No.: 11/979,507

(22) Filed: Nov. 5, 2007

(65) Prior Publication Data

US 2008/0259772 A1    Oct. 23, 2008

(30) Foreign Application Priority Data

Nov. 15, 2006   (JP)   .............................. 2006-308871

(51) Int. Cl.
*G11B 7/00* (2006.01)
(52) U.S. Cl. ............... 369/44.27; 369/44.34; 369/44.25
(58) Field of Classification Search .............. 369/44.25, 369/44.27, 44.29, 44.34, 44.35, 44.41, 53.2, 369/53.23, 53.28
See application file for complete search history.

(56) References Cited

U.S. PATENT DOCUMENTS

2001/0017348 A1* 8/2001 Ishihara ....................... 250/226
2004/0223425 A1* 11/2004 Ishiyama ................... 369/53.35
2007/0177482 A1*  8/2007 Kamioka et al. ......... 369/112.02
2007/0206468 A1*  9/2007 Takahashi et al. ......... 369/44.27
2007/0230304 A1* 10/2007 Nakane et al. ........... 369/44.29
2007/0268795 A1* 11/2007 Yamaguchi et al. ....... 369/44.25
2008/0049567 A1*  2/2008 Mitsuda .................... 369/44.23

FOREIGN PATENT DOCUMENTS

| JP | 04-252435 | 9/1992 |
| JP | 09-326123 | 12/1997 |
| JP | 2005-203062 | 7/2005 |

* cited by examiner

*Primary Examiner*—Thang V Tran
(74) *Attorney, Agent, or Firm*—Morgan Lewis & Bockius LLP

(57) ABSTRACT

An objective lens is raised from below upwards with a DVD laser diode turned on and levels of detection signals A, B, C, and D from a four segment photodetector are acquired and stored in a RAM. A ratio $(A+D)/(B+C)$ in a direction of the X-axis is then calculated. When the ratio exceeds a predetermined value, a lens shift correction amount is calculated for the calculated ratio based on a correction table. The objective lens is then shifted in the direction of the X-axis in accordance with the calculated lens shift correction amount. These processes are executed before a series of processes required for achieving a focus-on state.

6 Claims, 5 Drawing Sheets

CORRECTION TABLE

| RATIO α | | LENS SHIFT CORRECTION AMOUNT (μm) |
|---|---|---|
| MIN | MAX | |
| - | -3.0 | +110 |
| -3.0 | -1.5 | +55 |
| -1.5 | +1.5 | 0 |
| +1.5 | +3.0 | -55 |
| +3.0 | - | -110 |

OPTICAL DISC REPRODUCING APPARATUS

This application is based on Japanese Patent Application No. 2006-308871 filed on Nov. 15, 2006, the contents of which are hereby incorporated by reference.

BACKGROUND OF THE INVENTION

1. Field of the Invention

The present invention relates to an optical disc reproducing apparatus for reproducing information recorded on an optical disc, and particularly relates to processing for correcting deviation of light received by a photodetector caused by lens shifting at the time of search operation by an optical pick-up.

2. Description of Related Arts

Conventionally, with an optical disc reproducing apparatus, a tracking servo for an optical pick-up is carried out in accordance with a tracking error signal. More specifically, the tracking servo for the optical pick-up is carried out in accordance with a track cross signal where pulse-width changes according to an amount of shifting (amount of deviation toward an inner periphery-side or outer periphery-side of a track on the optical disc) of an objective lens provided in the optical pick-up relative to a sled on which the optical pick-up is mounted.

For example, when the objective lens is shifted to the inner periphery side of a track on the optical disc, as a result of a tracking servo based on a track cross signal at this time, in order to return the objective lens to a normal position with respect to the track, tracking control is performed. In this tracking control, a tracking drive voltage is applied to a tracking actuator so that the objective lens is moved in a direction towards the outer periphery side with the objective lens then adopting a normal position with respect to the track.

However, with conventional optical disc reproducing apparatus, the processing described in the following is carried out by the system controller until the focus servo goes on. Here, a description is given where a DVD is loaded into the optical disc reproducing apparatus.

The system controller then turns a DVD laser diode on. A sum signal (A+B+C+D) and a focus error signal (A+C)−(B+D) are then acquired from a four segment photodetector. Next, the DVD laser diode is turned off, and a CD laser diode is turned on. Then, as described above, the sum signal (A+B+C+D) and the focus error signal (A+C)−(B+D) are acquired. After this, when the system controller determines that the inserted disc is a DVD as a result of the level of the sum signal (A+B+C+D) obtained with the DVD laser diode turned on being larger than the level of the sum signal (A+B+C+D) obtained with the CD laser diode turned on, the levels of detection signals A, B, C, and D from the four segment photodetector with the DVD laser diode turned on are individually adjusted so as to all be the same level. Next, the system controller carries out S-shaped signal balance adjustment of the acquired focus error signal and focus pulling-in setting for pulling in the focus servo with the DVD laser diode turned on. The focus servo is then turned on.

With optical disc reproducing apparatus of the related art, after turning the focus servo on and achieving a focus-on state using the processing described above, the tracking servo is turned on, and a spot of laser light from the optical pick-up is tracked on to a track on the optical disc. However, in processing for up to the focus servo being turned on as described above, when detracking (a state where the track-on is achieved at a location deviating from the center of the track) occurs, laser light is irradiated on a location deviating from the center of the track even when a focus-on state is achieved with the state remaining as is. As a result, jitter of the reproduced signal worsens and the quality of reproduction from the optical disc falls.

In the technology of the related art disclosed in JP-A-H09-326123, at the time of start-up or re-starting of the apparatus, when a convergent lens is moved away after coming close to the disc, or when a convergent lens comes close to the disc after being moved away, an amplitude of an S-shaped signal appearing on the focus error signal each time a convergent point of the optical beam passes through each information surface is measured. The focus system gain is then switched over so as to give a predetermined amplitude, and an optimum pulling-in level is set. However, in the technology of the related art, countermeasures for the case where detracking occurs are not disclosed for the processing up to the focus servo going on, and the problem described above therefore cannot be solved.

In the technology of the related art disclosed in JP-A-H04-252435, (A+D)−(B+C) is calculated and main information containing a tracking error component and an offset error component accompanying shift of an objective lens is created. Next, (A+B)−(C+D) is calculated, a transform coefficient is applied to the result so as to give a transformation to an offset error component. Correction information is then created, and tracking control is carried out. However, in this technology of the related art, countermeasures for the case where detracking occurs are not disclosed for the processing up to the focus servo going on. The problems described above therefore cannot be solved. Further, when optical discs that are subject to reproduction are, for example, DVD-ROMs and DVD-RWs, reflectance of the DVD-ROMs is greater than reflectance of the DVD-RWs. This means that the result for (A+D)−(B+C) of the DVD-ROMs is large compared to that of the DVD-RWs. When a number of types of optical disc are handled, the results of calculating (A+D)−(B+C) become different and become therefore ambiguous. This means that the precision of tracking control is effectively lowered.

In the related technology disclosed in JP-A-2005-203062, an amplitude of a phase difference tracking error signal is measured in the vicinity of an end section of an inner periphery-side and in the vicinity of an end section of an outer periphery-side within a recording region of an optical disc and minimum values are extracted. Both of the extracted minimum values are then compared, and the signal of the smaller amplitude is selected. An amplification rate for a phase difference tracking error signal is then decided in such a manner that it is always possible to detect the phase difference tracking error signal based on this smaller signal and a value set in advance. However, in this technology of the related art also, countermeasures for the case where detracking occurs are not disclosed for the processing up to the focus servo going on and the problem described above therefore cannot be solved.

SUMMARY OF THE INVENTION

In order to solve the problems described above, it is the object of the present invention to provide an optical disc reproducing apparatus that is capable of alleviating detracking at the time of an operation of searching an optical disc that is a target of reproduction using an optical pick-up by detecting an amount of deviation of light received in a radial direction of a disc by a photodetector of an optical pick-up, and making correction by moving the objective lens of the optical pick-up in a direction that cancels the amount of deviation.

To achieve this object, optical disc reproduction apparatus of the present invention is comprised of: a photodetector divided into four light-receiving regions of a first quadrant light-receiving region, a second quadrant light-receiving region, a third quadrant light-receiving region, and a fourth quadrant light-receiving region by an X-axis and a Y-axis in X-Y coordinates when a radial direction of an optical disc is taken to be the X-axis and a track direction of the optical disc is taken to be the Y-axis; an optical pick-up for irradiating laser light from a DVD (Digital Versatile Disc) laser diode or a CD (Compact Disc) laser diode onto the optical disc via an objective lens, receiving light reflected from the optical disc at the photodetector, and outputting first, second, third, and fourth detection signals of the first, second, third, and fourth quadrant light-receiving regions, respectively; a tracking servo section for shifting the objective lens in the radial direction of the optical disc; a focus servo section for shifting the objective lens in a vertical direction with respect to a recording surface of the optical disc; and a moving section for moving the optical pick-up in the radial direction of the optical disc. The optical disc reproduction apparatus further comprises a system controller, the system controller comprising: a DVD signal level acquiring and storing section for moving the objective lens upwards with the CD laser diode turned off and the DVD laser diode turned on, and acquiring levels of the first, second, third, and fourth detection signals from the photodetector for storage in a memory; a DVD ratio calculating section for calculating a ratio (A+D)/(B+C) in a direction of the X-axis when the levels of the first, second, third, and fourth detection signals stored in the memory are taken to be A, B, C, and D, respectively; a DVD lens shift correction amount calculating section for calculating a lens shift correction amount for the calculated ratio based on a correction table indicating a relationship of the ratio and the lens shift correction amount when the calculated ratio exceeds a predetermined value; and a DVD lens shift section for controlling the tracking servo section in accordance with the lens shift correction amount that is calculated so as to shift the objective lens in the direction of the X-axis when the calculated ratio exceeds the predetermined value. The system controller executes processing provided by said sections included therein and reflects results in a succeeding series of processes required for achieving a focus-on state.

Moreover, optical disc reproduction apparatus of the present invention is comprised of: a photodetector divided into four light-receiving regions of a first quadrant light-receiving region, a second quadrant light-receiving region, a third quadrant light-receiving region, and a fourth quadrant light-receiving region by an X-axis and a Y-axis in X-Y coordinates when a radial direction of an optical disc is taken to be the X-axis and a track direction of the optical disc is taken to be the Y-axis; an optical pick-up for irradiating laser light from a DVD laser diode or a CD laser diode onto the optical disc via an objective lens, receiving light reflected from the optical disc at the photodetector, and outputting first, second, third, and fourth detection signals of the first, second, third, and fourth quadrant light-receiving regions, respectively; a tracking servo section for shifting the objective lens in the radial direction of the optical disc; a focus servo section for shifting the objective lens in a vertical direction with respect to a recording surface of the optical disc; and a moving section for moving the optical pick-up in the radial direction of the optical disc. The optical disc reproduction apparatus further comprises a system controller, the system controller comprising: a CD signal level acquiring and storing section for moving the objective lens upwards with the DVD laser diode turned off and the CD laser diode turned on, and acquiring levels of the first, second, third, and fourth detection signals from the photodetector for storage in the memory; a CD ratio calculating section for calculating a ratio (A+D)/(B+C) in a direction of the X-axis when the levels of the first, second, third, and fourth detection signals stored in the memory are taken to be A, B, C, and D, respectively; a CD lens shift correction amount calculating section for calculating a lens shift correction amount for a calculated ratio based on a correction table indicating a relationship of the ratio and the lens shift correction amount when the calculated ratio exceeds a predetermined value; and a CD lens shift section for controlling the tracking servo section in accordance with the lens shift correction amount that is calculated so as to shift the objective lens in the direction of the X-axis when the calculated ratio exceeds the predetermined value. The system controller executes processing provided by said sections included therein and reflects results in a succeeding series of processes required for achieving a focus-on state.

Still further, optical disc reproduction apparatus of the present invention is comprised of: a photodetector divided into four light-receiving regions of a first quadrant light-receiving region, a second quadrant light-receiving region, a third quadrant light-receiving region, and a fourth quadrant light-receiving region by an X-axis and a Y-axis in X-Y coordinates when a radial direction of an optical disc is taken to be the X-axis and a track direction of the optical disc is taken to be the Y-axis; an optical pick-up for irradiating laser light from a DVD laser diode or a CD laser diode onto the optical disc via an objective lens, receiving light reflected from the optical disc at the photodetector, and outputting first, second, third, and fourth detection signals of the first, second, third, and fourth quadrant light-receiving regions, respectively; a tracking servo section for shifting the objective lens in the radial direction of the optical disc; a focus servo section for shifting the objective lens in a vertical direction with respect to a recording surface of the optical disc; and a moving section for moving the optical pick-up in the radial direction of the optical disc. The optical disc reproduction apparatus further comprises a system controller, the system controller comprising: a DVD signal level acquiring and storing section for moving the objective lens upwards with the CD laser diode turned off and the DVD laser diode turned on, and acquiring levels of the first, second, third, and fourth detection signals for DVD use from the photodetector for storage in the memory; a DVD ratio calculating section for calculating a ratio (A+D)/(B+C) for DVD use in a direction of the X-axis when the levels of the first, second, third, and fourth detection signals for DVD use stored in the memory are taken to be A, B, C, and D, respectively; a DVD lens shift correction amount calculating section for calculating a lens shift correction amount for the calculated ratio for DVD use based on a correction table indicating a relationship of the calculated ratio for DVD use and the lens shift correction amount for DVD use when the calculated ratio exceeds a predetermined value; a DVD lens shift section for controlling the tracking servo section in accordance with the lens shift correction amount for DVD use that is calculated so as to shift the objective lens in the direction of the X-axis when the calculated ratio for DVD use exceeds the predetermined value; a CD signal level acquiring and storing section for moving the objective lens upwards with the DVD laser diode turned off and the CD laser diode turned on, and acquiring the levels of the first, second, third and fourth detection signals from the photodetector for storage in the memory; a CD ratio calculating section for calculating a ratio (A+D)/(B+C) for CD use in the direction of the X-axis when the levels of the first, second, third, and fourth detection signals for CD use stored in the memory are taken to be A, B, C, and D, respectively; a CD lens shift correction amount calculating section for calculating a lens shift correction amount for the calculated ratio for CD use based on a correction table indicating a relationship of the calculated ratio for CD use and a lens shift correction amount for CD use when the calculated ratio exceeds a predetermined value; and a CD lens shift section for controlling the tracking servo section in accordance with the lens shift correction amount for CD use that is calculated so as to shift the objective lens in the direction of the X-axis when the calculated ratio for CD use exceeds the predetermined value. The system controller executes processing provided by said sections included therein and reflects results in a succeeding series of processes required for achieving a focus-on state.

According to the above configuration, the system controller adds a search operation that is an operation of acquiring the detection signals A, B, C, and D of the photodetector by moving the objective lens upwards with the DVD laser diode turned on and calculates the ratio in the direction of the X-axis after acquiring the levels of the detection signals A, B, C, and D. The lens shift correction amount due to the added search operation is then adopted only when this ratio is larger than a predetermined value. Therefore, the amount of deviation of light received at a light-receiving region of the photodetector in a direction of the X-axis is detected at the time of the search operation. It is then possible to alleviate detracking by moving the objective lens in a direction canceling this deviation and then making correction. DVD reproduction quality is therefore improved as a result.

DETAILED DESCRIPTION OF PREFERRED EMBODIMENTS

Figure 1:
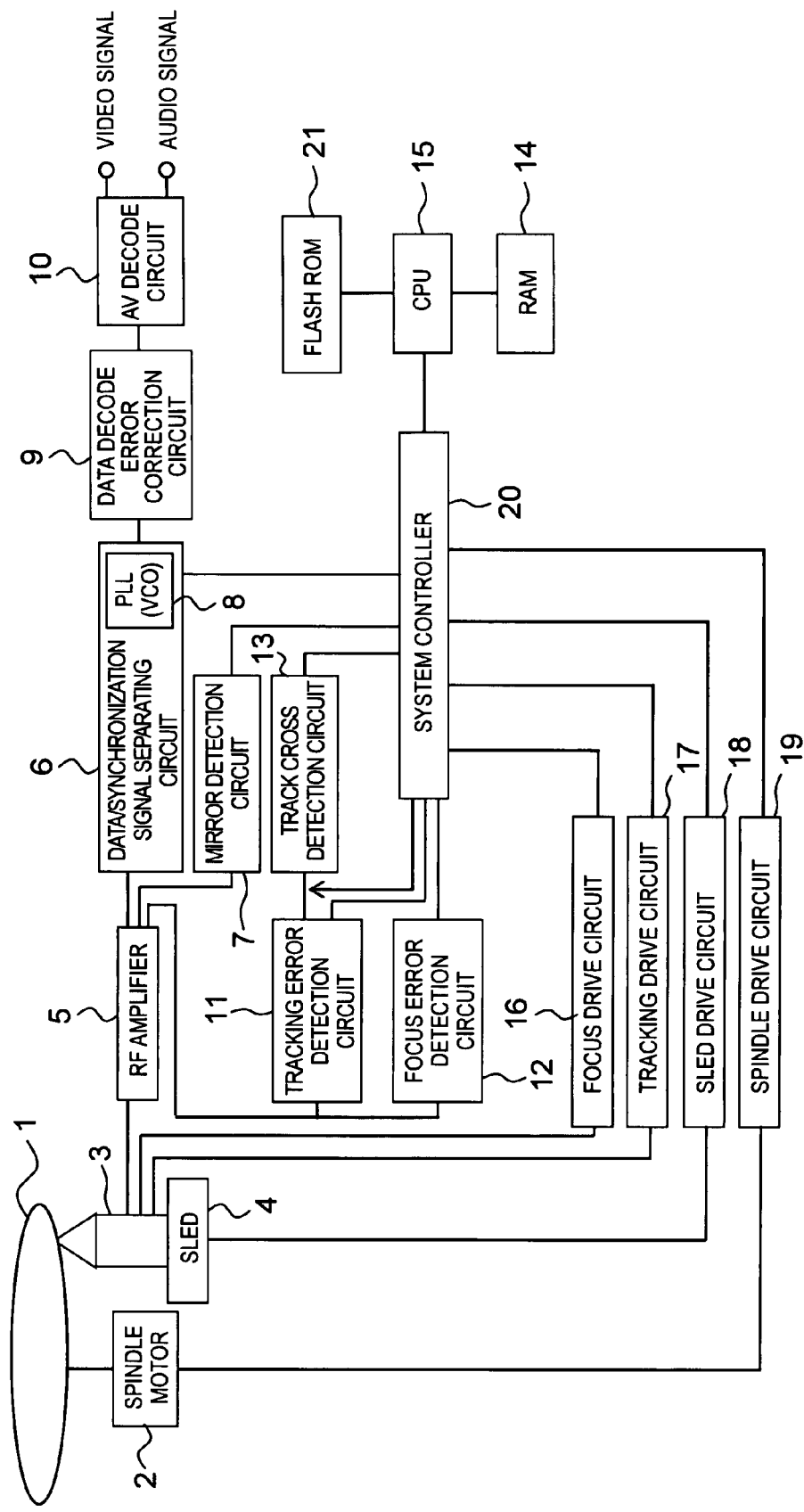
FIG. 1 is a block view showing a configuration of an optical disc reproducing apparatus of first, second, and third embodiments of the present invention.

Preferred embodiments of the present invention will now be described with reference to the attached drawings. FIG. 1 is a block view showing a configuration for an optical disc reproducing apparatus of first, second, and third embodiments of the present invention. In FIG. 1, this optical disc reproducing apparatus is provided with: an optical pick-up 3 for emitting laser light to reproduce information recorded on an optical disc 1 and receiving light reflected from the optical disc 1; a spindle motor 2 for rotating the optical disc 1; a spindle drive circuit 19 for driving this spindle motor 2; a tracking drive circuit 17 for driving a tracking actuator 31 (refer to FIG. 2) for carrying out a tracking servo for the optical pick-up 3; a focus drive circuit 16 for driving a focus actuator 32 (refer to FIG. 2) for carrying out the focus servo for the optical pick-up 3; a sled 4 for moving the optical pick-up 3 along in a radial direction of the optical disc; and a sled drive circuit 18 for driving this sled 4.

This optical disc reproducing apparatus is also provided with the following: an RF amplifier 5 for receiving a reproduction signal (read-out signal) from the optical pick-up 3 during reproduction of the optical disc 1, the RF amplifier 5 then generating an RF signal from this reproduction signal and amplifying the generated RF signal; a data/synchronization signal separating circuit 6 provided with a PLL (phase-locked loop) 8 containing a VCO (voltage controlled oscillator), for receiving the RF signal from the RF amplifier 5 and separating the RF signal into data and a synchronization signal; a data decode error correction circuit 9 for receiving data separated by the data/synchronization signal separating circuit 6, carrying out error checking by performing decoding, and carrying out error correction so as to output correct data when an error exists in the data; and an AV decode circuit 10 for receiving the correct data from the data decode error correction circuit 9, decoding the data, and outputting a video signal and an audio signal.

Further, the disc reproducing apparatus is provided with the following: a mirror detection circuit 7 for detecting mirror signals indicating mirror surfaces having no tracks on the optical disc 1 and contained in the RF signal from the RF amplifier 5 and for counting the mirror surfaces; a tracking error detection circuit 11 for detecting a tracking error signal contained in the reproduction signal from the optical pick-up 3; a focus error detection circuit 12 for detecting a focus error signal contained in the reproduction signal from the optical pick-up 3; and a track cross detection circuit 13 for detecting track crossing based on the tracking error signal from the tracking error detection circuit 11 and outputting a track pulse.

Further, the optical disc reproducing apparatus is provided with a system controller 20 for controlling each of the above configuration elements in accordance with a CPU 15 carrying out processing for the apparatus as a whole. A flash ROM 21 storing programs and data etc. required for the control by the system controller 20 and a RAM 14 for temporarily storing data required for the operations and processing by the CPU 15 are connected to the CPU 15.

The system controller 20 carries out control such as: control for the focus servo of the optical pick-up 3 based on the focus error signal contained in the reproduction signal from the optical pick-up 3; control for the tracking servo of the optical pick-up 3 based on the tracking error signal contained in the reproduction signal from the optical pick-up 3; control for driving the sled 4 via the sled drive circuit 18 so as to move the optical pick-up 3 in a radial direction of the optical disc 1; and control for rotating the spindle motor 2 via the spindle drive circuit 19.

The system controller 20 of the first embodiment is provided with the following: a DVD signal level acquiring and storing section for moving an objective lens 33 upwards with a DVD laser diode in an on-state so as to acquire levels A, B, C, and D of first, second, third, and fourth detection signals from the photodetector 37 for storage in the RAM 14; a DVD ratio calculating section for calculating a ratio $\alpha=(A+D)/(B+C)$ in a direction of the X-axis from these signal levels; a DVD lens shift correction amount calculating section for calculating the lens shift correction amount for the calculated ratio $\alpha$ based on a correction table indicating a relationship of the ratio and the lens shift correction amount when the ratio $\alpha$ exceeds a predetermined value; a DVD lens shift section for controlling a tracking servo section in accordance with the lens shift correction amount so as to shift the objective lens 33 in the direction of the X-axis when the ratio $\alpha$ exceeds the predetermined value; a DVD sum signal/focus error signal acquiring section for acquiring the sum signal for the detection signals A, B, C, D and the focus error signal with a DVD laser diode 361 turned on after reflecting the results of processing by the DVD signal level acquiring and storing section, the DVD ratio calculating section, the DVD lens shift correction amount calculating section, and the DVD lens shift section; a CD sum signal/focus error signal acquiring section for acquiring the sum signal for the detection signals A, B, C, and D and the focus error signal with the DVD laser diode 361 turned off and a CD laser diode 362 turned on; a DVD signal level adjusting section for individually adjusting the signal levels A, B, C, and D so that all of the levels are the same level by adjusting the gain of the RF amplifier 5 with the DVD laser diode turned on when it is determined that an inserted disc is a DVD because the level of the sum signal obtained by the DVD sum signal/focus error signal acquiring section is larger than the level of the sum signal obtained by the CD sum signal/focus error signal acquiring section, after reflecting the results of processing by the DVD signal level acquiring and storing section, the DVD ratio calculating section, the DVD lens shift correction amount calculating section, and the DVD lens shift section; and a DVD S-shaped signal balance adjustment/focus pulling-in setting section for performing S-shaped signal balance adjustment of the acquired focus error signal and setting focus pulling-in in order to pull in the focus servo with the DVD laser diode turned on after reflecting the results of processing by the DVD signal level acquiring and storing section, the DVD ratio calculating section, the DVD lens shift correction amount calculating section, and the DVD lens shift section.

Figure 2:
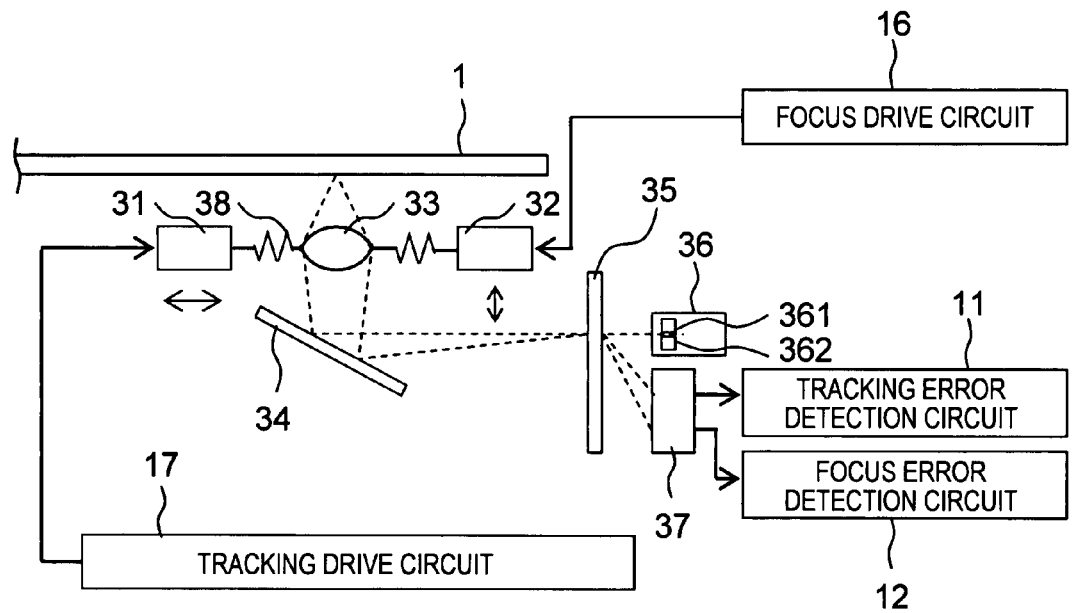
FIG. 2 is a block view illustrating an operation of an objective lens, a tracking actuator, and a focus actuator incorporated in the configuration of the optical pick-up shown in FIG. 1.

FIG. 2 is a block view illustrating an operation of the objective lens, the tracking actuator, and the focus actuator incorporated in a configuration of an optical pick-up shown in FIG. 1. In FIG. 2, numeral 36 represents a light source having the DVD laser diode 361 and the CD laser diode 362 respectively irradiating laser light. Laser light irradiated from the light source 36 passes through a hologram element 35 and is reflected by a mirror 34. The laser light is then focused by the objective lens 33 and is irradiated in the form of a spot onto a recording surface of the optical disc 1. After being focused again by the objective lens 33 and reflected by the mirror 34, reflected light reflected by the recording surface of the optical disc 1 is divided into a plurality of light beams while passing through the hologram element 35 and becomes incident to the four segment photodetector 37.

A +/−1 order light component diffracted by a track groove on the recording surface of the optical disc 1 is included in light reflected by the optical disc 1 and focused by the objective lens 33. Position setting is then carried out in such a way that first and second regions formed by dividing into two to the left and right with respect to a track groove direction at the surface of the hologram element 35 are positioned so that a light signal modulated by a +1 order light or −1 order light component passes through. Reflected light passing through the first and second regions at the hologram element 35 is then divided into different directions, received by the four segment photodetector 37, and photoelectrically converted. The tracking error detection circuit 11 then selects predetermined signals from individual signals outputted by the four segment photodetector 37. A tracking error signal is then generated from the difference between the selected signals. The focus error detection circuit 12 then selects predetermined signals from the individual signals outputted by the four segment photodetector 37. A focus error signal is then generated from the difference between the selected signals.

The lens holder 38 on which the objective lens 33 is mounted is supported in a freely moveable manner by the focus actuator 32 so as to move in a vertical direction with respect to the recording surface of the optical disc 1. Therefore, the lens holder 38 is driven by the focus actuator 32. A focus drive voltage passing through the focus drive circuit 16 based on the focus error signal outputted by the focus error detection circuit 12 is then supplied to the focus actuator 32, and focus servo control is carried out.

Further, the lens holder 38 is supported in a freely moveable manner by the tracking actuator 31 so as to move in a radial direction (tracking direction) of the optical disc 1 with respect to the sled 4. The lens holder 38 is therefore driven by the tracking actuator 31. A tracking drive voltage passing through the tracking drive circuit 17 based on the tracking error signal outputted by the tracking error detection circuit 11 is supplied to the tracking actuator 31 and tracking servo control is carried out.

At this time, the lens holder 38, i.e. the objective lens 33 is shifted in the tracking direction in accompaniment with eccentricity of the optical disc 1. The rotational frequency (eccentric frequency) of the optical disc 1 is high at, for example, a number of Hz to a number of tens of Hz, while a frequency range of a moving operation for the sled 4 is low at, for example, 1 Hz. This means that only the objective lens 33 follows the track groove of the optical disc 1 during the tracking servo and the objective lens 33 is therefore shifted with respect to the sled 4 due to eccentricity of the track groove.

Figure 3:
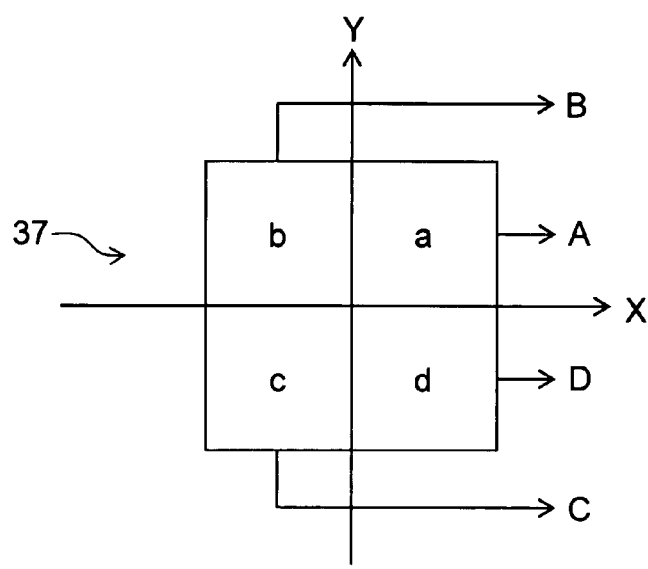
FIG. 3 is a view showing a light-receiving region of a four segment photodetector of the first, second, and third embodiments.

FIG. 3 is a view showing a light-receiving region of the four segment photodetector 37 of the first, second, and third embodiments. In FIG. 3, the X-axis indicates the radial direction of the optical disc, and the Y-axis indicates the track direction of the optical disc. In XY coordinates, a light-receiving region a is arranged at a first quadrant, a light-receiving region b is arranged at a second quadrant, a light-receiving region c is arranged at a third quadrant, and a light-receiving region d is arranged at a fourth quadrant. Further, symbol A denotes a detection signal detected by the light-receiving region a, symbol B denotes a detection signal detected by the light-receiving region b, symbol C denotes a detection signal detected by the light-receiving region c, and symbol D denotes a detection signal detected by the light-receiving region d. The tracking error signal is therefore (A+D)−(B+C), and the focus error signal obtained by an astigmatism method is (A+C)−(B+D). In particular, in this embodiment, a ratio $\alpha=(A+D)/(B+C)$ of the (A+D) signal level and the (B+C)

signal level is calculated. Hereafter, the tracking error signal, the focus error signal, and the ratio α denote the calculated results using the above operation unless otherwise specified.

Figures 4, 5:
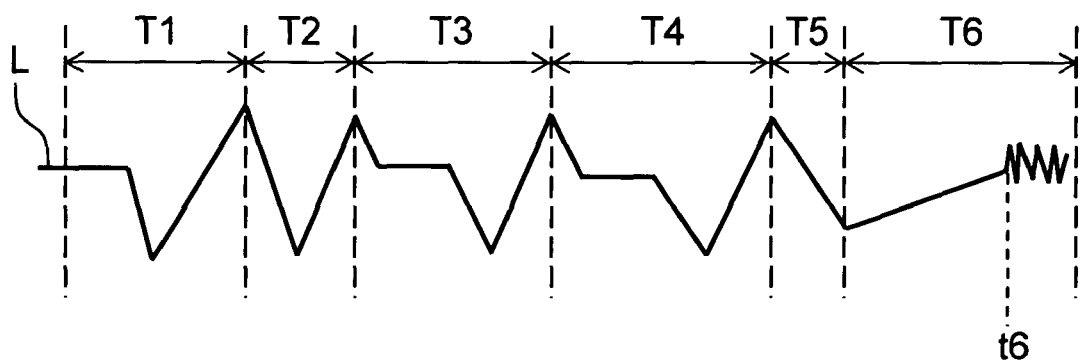
FIG. 4 is a view showing an example of a correction table illustrating the relationship between a ratio α and a lens shift correction amount of the first embodiment.
FIG. 5 is a timing chart illustrating individual steps leading up to the focus-on state being achieved after a process for a search operation is additionally executed in the beginning while a DVD laser diode of the optical pick-up is kept on in the first embodiment.

FIG. 4 is a view showing an example of a correction table illustrating the relationship between the ratio α and the lens shift correction amount of the first embodiment. In the correction table shown in FIG. 4, the ratio α denotes the aforementioned ratio (A+D)/(B+C) in dB (decibels). A limit for the lens shift correction amount is set to ±110 μm. If the ratio α is −3.0 dB, then the lens shift correction amount is +110 μm. When the ratio α is greater than −3.0 dB and less than −1.5 dB, then the lens shift correction amount is +55 μm. When the ratio α is greater than −1.5 dB and less than +1.5 dB, the lens shift correction amount is 0 μm and lens shift correction is not performed. Namely, when the ratio α is within ±1.5 dB, the lens shift correction amount is 0 μm and lens shift correction is not performed. When the ratio α is greater than +1.5 dB and less than +3 dB, then the lens shift correction amount is −55 μm. If the ratio α is +3.0 dB, then the lens shift correction amount is −110 μm. The extent of movement of the objective lens 33 is set taking into consideration the range of possible movement of the lens.

FIG. 5 is a timing chart illustrating individual steps leading up to a focus-on state being achieved after a process for a search operation (an operation where an objective lens is moved upwards and levels of detection signals A, B, C, and D are obtained from the four segment photodetector by the system controller) is additionally executed in the beginning while the DVD laser diode of the optical pick-up is kept on in the first embodiment.

In FIG. 5, a line L indicates a voltage outputted by the focus drive circuit 16 and supplied to the focus actuator 32. A direction upwards for this voltage denoted by the line L corresponds to a direction (a direction approaching the recording surface of the optical disc 1) of movement of the objective lens 33 upwards. The line L therefore indicates change in level of a voltage applied by the focus drive circuit 16 to the focus actuator 32.

First, in a period T1, the detection signals A, B, C, and D are acquired from the four segment photodetector 37 with the CD laser diode 362 off and the DVD laser diode 361 on. A ratio α of the (A+D) signal level and the (B+C) signal level that is the ratio in the direction of the X-axis is then calculated. When the ratio α exceeds a predetermined value, control is carried out to shift the objective lens 33 in the direction of the X-axis (a direction for canceling deviation of the received light).

In a period T2, a sum signal (A+B+C+D) that is a reproduction signal (RF signal) and a focus error signal (A+C)−(B+D) are acquired with the DVD laser diode 361 turned on. The level of the sum signal at this time is used in discerning that the disc type of the inserted disc is a DVD. Further, the sum signal and the focus error signal at this time are used in amplitude adjustment of the respective signals.

In a period T3, the sum signal and the focus error signal are acquired with the DVD laser diode 361 turned off and the CD laser diode 362 turned on. The level of the sum signal at this time is used in discerning that the disc type of the inserted disc is a CD. Further, the sum signal and the focus error signal at this time are used in amplitude adjustment of the respective signals.

In a period T4, individual amplitude adjustment of the detection signals A, B, C, and D for the DVD is carried out. In a period T5, S-shaped signal balance adjustment of the focus error signal and setting of focus pulling-in are carried out for the DVD. In a period T6, a focus-on state is achieved at a time t6.

The above operation is now described in further detail. In the period T1, the DVD signal level acquiring and storing section of the system controller 20 raises the objective lens 33 upwards with the CD laser diode 362 turned off and the DVD laser diode 361 turned on so as to acquire the levels of the detection signals A, B, C, and D from the four segment photodetector 37 for storing in the RAM 14. The DVD ratio calculating section of the system controller 20 then refers to the levels of the detection signals A, B, C, and D stored in the RAM 14 and calculates the ratio α in the direction of the X-axis. When the calculated ratio α exceeds a predetermined value, the DVD lens shift correction amount calculating section calculates the lens shift correction amount for the calculated ratio α based on the correction table indicating the relationship of the ratio and the lens shift correction amount (refer to FIG. 4). Further, when the calculated ratio α exceeds the predetermined value, the DVD lens shift section controls the tracking drive circuit 17 in accordance with the calculated lens shift correction amount so as to shift the objective lens 33 in the direction of the X-axis (in a direction canceling deviation of the received light).

In the period T2, the results of processing by the DVD signal level acquiring and storing section, the DVD ratio calculating section, the DVD lens shift correction amount calculating section, and the DVD lens shift section are reflected. The DVD sum signal/focus error signal acquiring section of the system controller 20 acquires the sum signal and the focus error signal from the detection signals A, B, C, and D with the DVD laser diode 361 turned on.

In the period T3, the CD sum signal/focus error signal acquiring section of the system controller 20 acquires the sum signal and the focus error signal from the detection signals A, B, C, and D with the DVD laser diode 361 turned off and the CD laser diode 362 turned on.

In the period T4, the results of processing by the DVD signal level acquiring and storing section, the DVD ratio calculating section, the DVD lens shift correction amount calculating section, and the DVD lens shift section are reflected. When it is determined that an inserted disc is a DVD because the level of the sum signal acquired by the DVD sum signal/focus error signal acquiring section is larger than the level of the sum signal acquired by the CD sum signal/focus error signal acquiring section, the DVD signal level adjusting section of the system controller 20 individually adjusts the levels of the detection signals A, B, C, and D to all be the same level by adjusting the gain of the RF amplifier 5 with the CD laser diode 362 turned off and the DVD laser diode 361 turned on. Further, in the period T4, the system controller 20 makes the gain of the focus error detection circuit 12 high, raises the level of the focus error signal up to the target level, and carries out a search operation.

In the period T5, the results of processing (the lens shift correction amount) by the DVD signal level acquiring and storing section, the DVD ratio calculating section, the DVD lens shift correction amount calculating section, and the DVD lens shift section are reflected. The DVD S-shaped signal balance adjustment/focus pulling-in setting section of the system controller 20 carries out S-shaped signal balance adjustment and setting of focus pulling-in in order to pull in the focus servo for the focus error signal that is acquired, with the DVD laser diode 361 turned on. In the period T6, the focusing is achieved at the time t6 using the focus servo performed by the focus error detection circuit 12, the focus drive circuit 16, and the focus actuator 32.

In this focus pulling-in setting, the sum signal and the focus error signal are measured. A first condition is then established when the amplitude of the focus error signal exceeds half of a predetermined value of the focus error signal. After this first condition is established, a second condition is then established when the amplitude of the sum signal exceeds half of a predetermined value of the sum signal. When the objective lens 33 is then shifted in an upward direction with this situation maintained, and when a search operation is performed on the optical disc 1, the focusing becomes just-in-focus, and a third condition is established. The focus pulling-in setting can therefore be said to be setting in order to pull in the focus servo by establishing the first, second, and third conditions.

Figure 6:
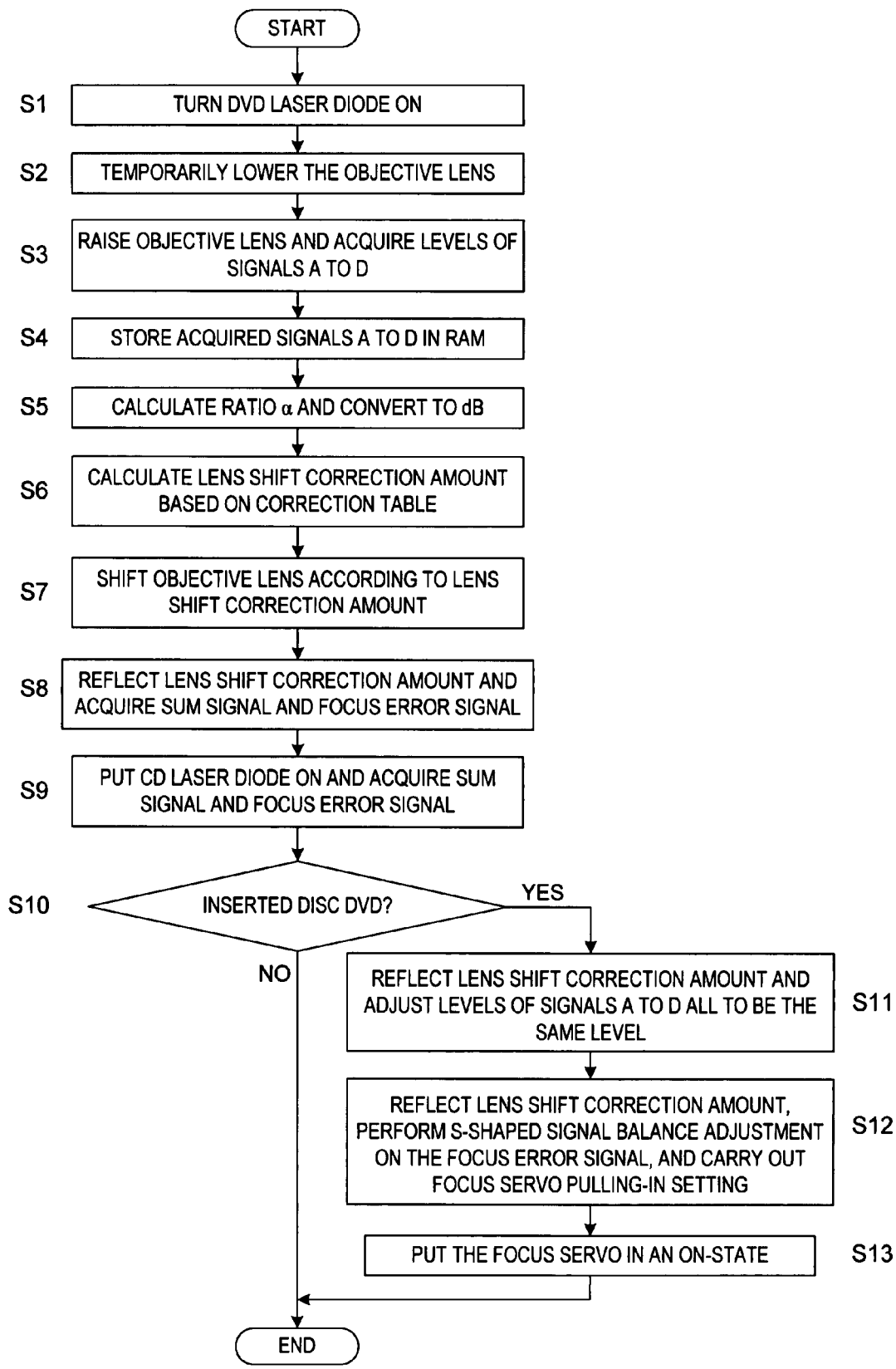
FIG. 6 is a flowchart illustrating an operation leading up to the focus-on state being achieved after the process for a search operation is additionally executed in the beginning while the DVD laser diode of the optical pick-up is kept on in the first embodiment.

FIG. 6 is a flowchart illustrating, in the first embodiment, how a search operation (an operation where levels of the detection signals A, B, C, and D from the four segment photodetector are acquired by the system controller while moving the objective lens in an upward direction) with the DVD laser diode of the optical pick-up turned on is initially added one time, and illustrates each step thereafter up to the focus-on state being achieved. A description is now given with reference to this flowchart and FIG. 1 to FIG. 5 of an operation for initially adding a search operation where the DVD laser diode of the optical pick-up is turned on one time, and of the operation thereafter up to the focus-on state being achieved.

First, the DVD signal level acquiring and storing section of the system controller 20 turns the DVD laser diode 361 on (step S1) and controls the focus drive circuit 16 so that the focus actuator 32 is driven and the objective lens 33 is temporarily lowered (step S2). The DVD signal level acquiring and storing section of the system controller 20 then controls the focus drive circuit 16 in the period T1, drives the focus actuator 32, raises the objective lens 33, obtains the levels of the detection signals A, B, C, and D from the four segment photodetector 37 respectively (step S3), and stores them in the RAM 14 (step S4).

In the period T1, the DVD ratio calculating section of the system controller 20 calculates the ratio (A+D)/(B+C) in the direction of the X-axis and converts this ratio to the ratio $\alpha$ denoted in decibels (step S5). In the period T1, when the ratio $\alpha$ exceeds a predetermined value, the DVD lens shift correction amount calculating section of the system controller 20 calculates the lens shift correction amount for the ratio $\alpha$ based on the correction table indicating the relationship of the ratio and the lens shift correction amount (refer to FIG. 4) (step S6). When the ratio $\alpha$ exceeds the predetermined value, in the period T1, the DVD lens shift section controls the tracking drive circuit 17 in accordance with the lens shift correction amount that is calculated and drives the tracking actuator 31. The objective lens 33 is then shifted in the direction of the X-axis that is a direction that cancels deviation of light received by the four segment photodetector 37 (step S7).

Next, in the period T2, the DVD sum signal/focus error signal acquiring section of the system controller 20 reflects the results of the processing (the lens shift correction amount) by the DVD signal level acquiring and storing section, the DVD ratio calculating section, the DVD lens shift correction amount calculating section, and the DVD lens shift section. The sum signal and the focus error signal are then acquired with the DVD laser diode 361 turned on (step S8).

After this, in the period T3, the CD sum signal/focus error signal acquiring section of the system controller 20 returns the output of the tracking drive circuit 17 to zero in order not to reflect the amount of lens correction. The sum signal and the focus error signal are then acquired with the DVD laser diode 361 turned off and the CD laser diode 362 turned on (step S9).

Next, in the period T4, the DVD signal level adjusting section of the system controller 20 reflects the results of processing (the lens shift correction amount) by the DVD signal level acquiring and storing section, the DVD ratio calculating section, the DVD lens shift correction amount calculating section, and the DVD lens shift section. When it is determined that the inserted disc is a DVD (step S10) because the level of the sum signal acquired by the DVD sum signal/focus error signal acquiring section is larger than the level of the sum signal acquired by the CD sum signal/focus error signal acquiring section, the levels of the detection signals A, B, C, and D are individually adjusted to all be the same level by adjusting the gain of the RF amplifier 5 with the CD laser diode 362 turned off and the DVD laser diode 361 turned on (step S11).

Next, in the period T5, the DVD S-shaped signal balance adjustment/focus pulling-in setting section of the system controller 20 reflects the results of processing (the lens shift correction amount) by the DVD signal level acquiring and storing section, the DVD ratio calculating section, the DVD lens shift correction amount calculating section, and the DVD lens shift section. S-shaped signal balance adjustment of the acquired focus error signal and focus pulling-in setting in order to pull in the focus servo is then carried out with the CD laser diode 362 turned off and the DVD laser diode 361 turned on (step S12). In the period T6, the system controller 20 turns the focusing on at time t6 (step S13) using a focusing servo performed by the focus error detection circuit 12, the focus drive circuit 16, and the focus actuator 32.

According to the first embodiment, the system controller 20 carries out an additional search operation that is an operation for acquiring the detection signals A, B, C, and D of the photodetector 37 by moving the objective lens 33 upwards with the DVD laser diode 361 turned on and acquires the levels of the detection signals A, B, C, and D. After this, the ratio $\alpha$ in the direction of the X-axis is calculated, and the lens shift correction amount resulting from the added search operation is adopted only when the ratio $\alpha$ is larger than the predetermined value. It is therefore possible to alleviate detracking at the time of a search operation by detecting an amount of deviation of light received by the light-receiving regions a, b, c, and d of the photodetector 37 in the direction of the X-axis, moving the objective lens 33 in a direction canceling this deviation, and making correction. As a result, reproduction quality for the DVD is increased.

Figure 7:
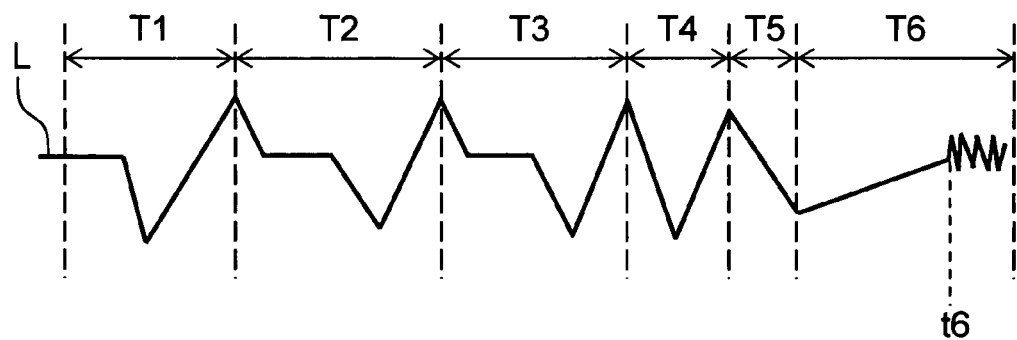
FIG. 7 is a timing chart illustrating individual steps leading up to the focus-on state being achieved after the process for a search operation is additionally executed in the beginning while the CD laser diode of the optical pick-up is kept on in the second embodiment.

FIG. 7 is a timing chart illustrating how a search operation (an operation where levels of the detection signals A, B, C, and D from the four segment photodetector are acquired by the system controller while moving the objective lens in an upward direction) with the DVD laser diode of the optical amplifier turned on is initially added one time, and illustrates each step thereafter up to the focus-on state being achieved in the first embodiment.

The system controller 20 of a second embodiment is provided with the following: a CD signal level acquiring and storing section for moving the objective lens 33 upwards with the DVD laser diode 361 turned off and the CD laser diode 362 turned on, and acquiring the levels of the first, second, third, and fourth detection signals A, B, C, and D from the four segment photodetector 37 for storage in the RAM 14; a CD ratio calculating section for calculating a ratio $\alpha=(A+D)/(B+C)$ in the direction of the X-axis from these signal levels; a CD lens shift correction amount calculating section for calculating a lens shift correction amount for the calculated ratio $\alpha$ based on a correction table indicating a relationship of the ratio and the lens shift correction amount when the ratio $\alpha$ exceeds a predetermined value; a CD lens shift section for controlling the tracking servo section in accordance with the lens shift correction amount that is calculated so as to shift the objective lens 33 in the direction of the X-axis when the ratio α exceeds the predetermined value; a DVD sum signal/focus error signal acquiring section for acquiring the sum signal for the detection signals A, B C, and D and the focus error signal with the CD laser diode 362 turned off and the DVD laser diode 361 turned on; a CD sum signal/focus error signal acquiring section for acquiring the sum signal for the detection signals A, B, C, and D and the focus error signal with the DVD laser diode 361 turned off and the CD laser diode 362 turned on so as to reflect the processing results by the CD signal level acquiring and storing section, the CD ratio calculating section, the CD lens shift correction amount calculating section, and the CD lens shift section; a CD signal level adjusting section for individually adjusting the signal levels A, B, C, and D so that all of the levels are the same level by adjusting the gain of the RF amplifier 5 with the DVD laser diode 361 turned off and the CD laser diode 362 turned on when it is determined that an inserted disc is a CD because the level of the sum signal obtained by the CD total signal/focus error signal acquiring section is larger than the level of the sum signal obtained by the DVD sum signal/focus error signal acquiring section, after reflecting results of processing by the CD signal level acquiring and storing section, the CD ratio calculating section, the CD lens shift correction amount calculating section, and the CD lens shift section; and a CD S-shaped signal balance adjustment/focus pulling-in setting section for performing S-shaped signal balance adjustment of the acquired focus error signal and setting focus pulling-in in order to pull in the focus servo with the DVD laser diode 361 turned off and the CD laser diode 362 turned on after reflecting the results of processing by the CD signal level acquiring and storing section, the CD ratio calculating section, the CD lens shift correction amount calculating section, and the CD lens shift section.

In FIG. 7, a line L indicates a voltage outputted by the focus drive circuit 16 and supplied to the focus actuator 32. An upward direction of this voltage denoted by the line L corresponds to a direction of movement of the objective lens 33 upwards. The line L therefore indicates change in level of a voltage applied by the focus drive circuit 16 to the focus actuator 32.

First, in a period T1, the detection signals A, B, C, and D are acquired from the four segment photodetector 37 with the DVD laser diode 361 turned off and the CD laser diode 362 turned on. A ratio α of the (A+D) signal level and the (B+C) signal level that is the ratio in the direction of the X-axis is then calculated. When the ratio α exceeds a predetermined value, control is carried out to shift the objective lens 33 in the direction of the X-axis.

In a period T2, a sum signal (A+B+C+D) that is a reproduction signal (RF signal) and a focus error signal (A+C)–(B+D) are acquired with the CD laser diode 362 off and the DVD laser diode 361 on. The level of the sum signal at this time is used in discerning that the disc type of the inserted disc is a DVD. Further, the sum signal and the focus error signal at this time are used in amplitude adjustment of the respective signals.

In a period T3, the sum signal and the focus error signal are acquired with the DVD laser diode 361 off and the CD laser diode 362 on. The level of the sum signal at this time is used in discerning that the disc type of the inserted disc is a CD. Further, the sum signal and the focus error signal at this time are used in amplitude adjustment of the respective signals.

In a period T4, individual amplitude adjustment of detection signals A, B, C, and D for the CD is carried out. In a period T5, S-shaped signal balance adjustment of the focus error signal and setting of focus pulling-in is carried out for the CD. In a period T6, a focus-on state is achieved at a time t6.

The above operation is now described in further detail. In the period T1, the CD signal level acquiring and storing section of the system controller 20 raises the objective lens 33 upwards with the DVD laser diode 361 turned off and the CD laser diode 362 turned on so as to acquire the levels of the detection signals A, B, C, and D from the four segment photodetector 37 for storing in the RAM 14. The CD ratio calculating section of the system controller 20 then refers to the levels of the detection signals A, B, C, and D stored in the RAM 14 and calculates the ratio α in the direction of the X-axis. When the calculated ratio α exceeds a predetermined value, the CD lens shift correction amount calculating section calculates the lens shift correction amount for the calculated ratio α based on the correction table indicating the relationship of the ratio and the lens shift correction amount. Further, when the calculated ratio α exceeds the predetermined value, the CD lens shift section controls the tracking drive circuit 17 in accordance with the calculated lens shift correction amount so as to shift the objective lens 33 in the direction of the X-axis.

In the period T2, as the results of processing (lens shift correction amount) by the CD signal level acquiring and storing section, the CD ratio calculating section, and the CD lens shift correction amount calculating section are not reflected, and the DVD sum signal/focus error signal acquiring section of the system controller 20 acquires the sum signal and the focus error signal from the detection signals A, B, C, and D with the CD laser diode 362 turned off and the DVD laser diode 361 turned on.

In the period T3, the CD sum signal/focus error signal acquiring section of the system controller 20 reflects the results of processing (the lens shift correction amount) by the CD signal level acquiring and storing section, the CD ratio calculating section, the CD lens shift correction amount calculating section, and the CD lens shift section. The sum signal and the focus error signal are then acquired with the DVD laser diode 361 turned off and the CD laser diode 362 turned on.

In the period T4, the results of processing (the lens shift correction amount) by the CD signal level acquiring and storing section, the CD ratio calculating section, the CD lens shift correction amount calculating section, and the CD lens shift section are reflected. When it is determined that an inserted disc is a CD because the level of the sum signal acquired by the CD sum signal/focus error signal acquiring section is larger than the level of the sum signal acquired by the DVD sum signal/focus error signal acquiring section, the CD signal level adjustment section of the system controller 20 therefore individually adjusts the levels of the detection signals A, B, C, and D to all be the same level by adjusting the gain of the RF amplifier 5 with the DVD laser diode 361 turned off and the CD laser diode 362 turned on. Further, in the period T4, the system controller 20 makes the gain of the focus error detection circuit 12 high, raises the level of the focus error signal up to the target level, and carries out a search operation.

In the period T5, the results of processing (the lens shift correction amount) by the CD signal level acquiring and storing section, the CD ratio calculating section, the CD lens shift correction amount calculating section, and the CD lens shift section are reflected. The CD S-shaped signal balance adjustment/focus pulling-in setting section of the system controller 20 carries out S-shaped signal balance adjustment and setting of focus pulling-in in order to pull in the focus servo for the focus error signal that is acquired, with the DVD laser diode 361 turned off and the CD laser diode 362 turned on. In the period T6, the focusing is achieved at the time t6 using the focus servo performed by the focus error detection circuit 12, the focus drive circuit 16, and the focus actuator 32.

According to the second embodiment, the system controller 20 carries out an additional search operation that is an operation for acquiring the detection signals A, B, C, and D of the photodetector 37 by moving the objective lens 33 upwards with the DVD laser diode 361 turned off and the CD laser diode 362 turned on, and acquires the levels of the detection signals A, B, C, and D. After this, the ratio α in the direction of the X-axis is calculated, and the lens shift correction amount resulting from the added search operation is adopted only when the ratio α is larger than the predetermined value. It is therefore possible to alleviate detracking at the time of a search operation by detecting an amount of deviation of light received by the light-receiving regions a, b, c, and d of the photodetector 37 in the direction of the X-axis, moving the objective lens 33 in a direction canceling this deviation, and making correction. As a result, reproduction quality for the CD is increased.

Figure 8:
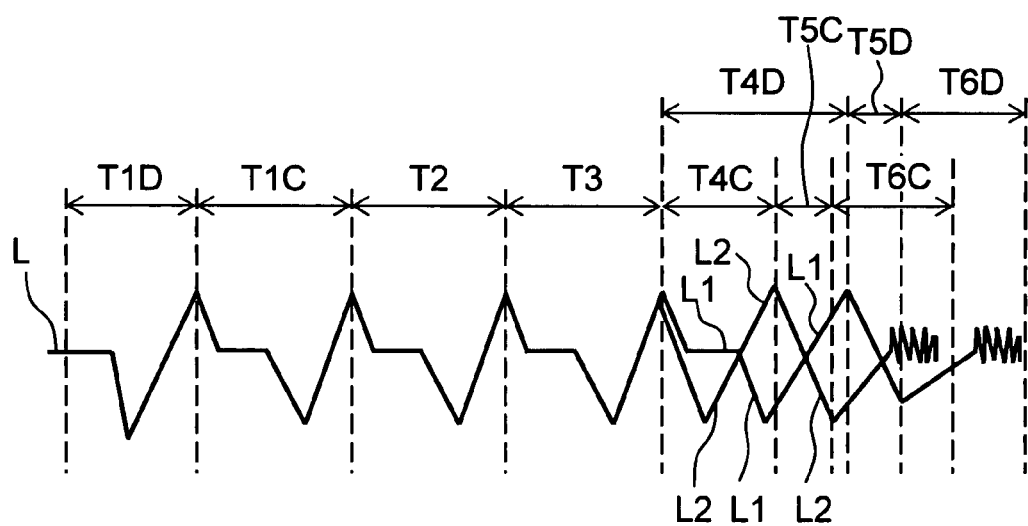
FIG. 8 is a timing chart illustrating individual steps leading up to the focus-on state being achieved after the process for the search operation is additionally executed in the beginning while the DVD laser diode or the CD laser diode of the optical pick-up is kept on in the third embodiment.

FIG. 8 is a timing chart illustrating how a search operation (an operation where levels of the detection signals A, B, C, and D from the four segment photodetector are acquired by the system controller while moving the objective lens in an upward direction) with the DVD laser diode or the CD laser diode of the optical amplifier in an on state is initially added one time, and illustrates each step thereafter up to the focus-on state being achieved in a third embodiment.

The system controller 20 of the third embodiment is provided with the following: a DVD signal level acquiring and storing section for raising the objective lens 33 upwards with the CD laser diode 362 turned off and the DVD laser diode 361 turned on and acquiring the levels of the first, second, third, and fourth detection signals A, B, C, and D from the four segment photodetector 37 for storage in the RAM 14; a DVD ratio calculating section for calculating a ratio α=(A+D)/(B+C) in a direction of the X-axis from these signal levels; a DVD lens shift correction amount calculating section for calculating a lens shift correction amount for the calculated ratio α based on a correction table indicating a relationship of the ratio and the lens shift correction amount when the ratio α exceeds a predetermined value; a DVD lens shift section for controlling the tracking servo section in accordance with the lens shift correction amount that is calculated so as to shift the objective lens 33 in the X-direction when the ratio α exceeds the predetermined value; a CD signal level acquiring and storing section for moving the objective lens 33 upwards with the DVD laser diode 361 turned off and the CD laser diode 362 turned on and acquiring the levels of the first, second, third, and fourth detection signals A, B, C, and D, respectively, from the four segment photodetector 37 for storage in the RAM 14; a CD ratio calculating section for calculating a ratio α=(A+D)/(B+C) in a direction of the X-axis from these signal levels; a CD lens shift correction amount calculating section for calculating a lens shift correction amount for the calculated ratio α based on a correction table indicating a relationship of the ratio α and the lens shift correction amount when the ratio α exceeds a predetermined value; and a CD lens shift section for controlling the tracking servo section in accordance with the lens shift correction amount that is calculated so as to shift the objective lens 33 in the direction of the X-axis when the ratio α that is calculated exceeds the predetermined value.

The system controller 20 is further provided with the following: a DVD sum signal/focus error signal acquiring section for acquiring the sum signal for the detection signals A, B C, and D and the focus error signal with the CD laser diode 362 turned off and the DVD laser diode 361 turned on; a CD sum signal/focus error signal acquiring section for acquiring the sum signal for the detection signals A, B, C, and D and the focus error signal with the DVD laser diode 361 turned off and the CD laser diode 362 turned on after reflecting the processing results by the CD signal level acquiring and storing section, the CD ratio calculating section, the CD lens shift correction amount calculating section, and the CD lens shift section; a DVD signal level adjusting section for individually adjusting the levels of the signals A, B, C, and D to all be the same level by adjusting the gain of the RF amplifier 5 with the CD laser diode 362 turned off and the DVD laser diode 361 turned on after reflecting the results of processing by the DVD signal level acquiring and storing section, the DVD ratio calculating section, the DVD lens shift correction amount calculating section, and the DVD lens shift section when the inserted disc is determined to be a DVD because the level of the sum signal acquired by the DVD sum signal/focus error signal acquiring section is larger than the level of the sum signal acquired by the CD sum signal/focus error signal acquiring section; a CD signal level adjusting section for individually adjusting the levels of the signals A, B, C, and D to all be the same level by adjusting the gain of the RF amplifier 5 with the DVD laser diode 361 turned off and the CD laser diode 362 turned on after reflecting the results of processing by the CD signal level acquiring and storing section, the CD ratio calculating section, the CD lens shift correction amount calculating section, and the CD lens shift section when the inserted disc is determined to be a CD because the level of the sum signal acquired by the CD sum signal/focus error signal acquiring section is larger than the level of the sum signal acquired by the DVD sum signal/focus error signal acquiring section; a DVD S-shaped signal balance adjustment/focus pulling-in setting section for performing S-shaped signal balance adjustment of the acquired focus error signal and setting focus pulling-in in order to pull in the focus servo with the CD laser diode 362 turned off and the DVD laser diode 361 turned on after reflecting the results of processing by the DVD signal level acquiring and storing section, the DVD ratio calculating section, the DVD lens shift correction amount calculating section, and the DVD lens shift section; and a CD S-shaped signal balance adjustment/focus pulling-in setting section for performing S-shaped signal balance adjustment of the acquired focus error signal and setting focus pulling-in in order to pull in the focus servo with the DVD laser diode 361 turned off and the CD laser diode 362 turned on after reflecting the results of processing by the CD signal level acquiring and storing section, the CD ratio calculating section, the CD lens shift correction amount calculating section, and the CD lens shift section.

In FIG. 8, a line L indicates a voltage outputted by the focus drive circuit 16 and supplied to the focus actuator 32. An upward direction for this voltage denoted by the line L corresponds to a direction of movement of the objective lens 33 upwards. The line L therefore indicates change in level of a voltage applied by the focus drive circuit 16 to the focus actuator 32.

First, in a period T1D, the detection signals A, B, C, and D are acquired from the four segment photodetector 37 with the CD laser diode 362 turned off and the DVD laser diode 361 turned on. A ratio α of the (A+D) signal level and the (B+C) signal level that is the ratio in the direction of the X-axis is then calculated. When the ratio α exceeds a predetermined value, control is carried out to shift the objective lens 33 in the direction of the X-axis.

In a period T1C, the detection signals A, B, C, and D are acquired from the four segment photodetector 37 with the DVD laser diode 361 off and the CD laser diode 362 on. A ratio α of the (A+D) signal level and the (B+C) signal level that is the ratio in the direction of the X-axis is then calculated. When the ratio α exceeds a predetermined value, control is carried out to shift the objective lens 33 in the direction of the X-axis.

In a period T2, a sum signal (A+B+C+D) that is a reproduction signal (RF signal) and a focus error signal (A+C)−(B+D) are acquired with the CD laser diode 362 off and the DVD laser diode 361 on. The level of the sum signal at this time is used in discerning that the disc type of the inserted disc is a DVD. Further, the sum signal and the focus error signal at this time are used in amplitude adjustment of the respective signals.

In a period T3, the sum signal and the focus error signal are acquired with the DVD laser diode 361 off and the CD laser diode 362 on. The level of the sum signal at this time is used in discerning that the disc type of the inserted disc is a CD. Further, the sum signal and the focus error signal at this time are used in amplitude adjustment of the respective signals.

In a period T4D, individual amplitude adjustment of the detection signals A, B, C, and D for the DVD is carried out. A line L1 occurring in the period T4D indicates a focus drive voltage (voltage applied to the focus actuator 32) for the DVD. In the period T4C, individual amplitude adjustment of the detection signals A, B, C, and D for the CD is carried out. A line L2 occurring in the period T4C indicates a focus drive voltage for the CD.

In a period T5D, S-shaped signal balance adjustment of the focus error signal and setting of focus pulling-in is carried out for the DVD. In a period T5C, S-shaped signal balance adjustment of the focus error signal and setting of focus pulling-in is carried out for the CD. In a period T6D, the focus-on state is achieved for the DVD. In a period T6C, the focus-on state is achieved for the CD.

The above operation is now described in further detail. In the period T1D, the DVD signal level acquiring and storing section of the system controller 20 moves the objective lens 33 upwards with the CD laser diode 362 turned off and the DVD laser diode 361 turned on so as to acquire the levels of the detection signals A, B, C, and D from the four segment photodetector 37 for storing in the RAM 14. The DVD ratio calculating section of the system controller 20 then refers to the levels of the detection signals A, B, C, and D stored in the RAM 14 and calculates the ratio α in the X-direction. When the calculated ratio α exceeds a predetermined value, the DVD lens shift correction amount calculating section calculates a lens shift correction amount for the calculated ratio α based on the correction table indicating the relationship of the ratio and the lens shift correction amount. Further, when the calculated ratio α exceeds the predetermined value, the DVD lens shift section controls the tracking drive circuit 17 in accordance with the calculated lens shift correction amount so as to shift the objective lens 33 in the direction of the X-axis.

In the period T1C, the CD signal level acquiring and storing section of the system controller 20 moves the objective lens 33 upwards with the DVD laser diode 361 turned off and the CD laser diode 362 turned on so as to acquire the levels of the detection signals A, B, C, and D from the four segment photodetector 37 for storing in the RAM 14. The CD ratio calculating section of the system controller 20 then refers to the levels of the detection signals A, B, C, and D stored in the RAM 14 and calculates the ratio α in the X-direction. When the calculated ratio α exceeds a predetermined value, the CD lens shift correction amount calculating section calculates a lens shift correction amount for the calculated ratio α based on the correction table indicating the relationship of the ratio and the lens shift correction amount. Further, when the calculated ratio α exceeds the predetermined value, the CD lens shift section controls the tracking drive circuit 17 in accordance with the calculated lens shift correction amount so as to shift the objective lens 33 in the direction of the X-axis.

In the period T2, the results of processing (the lens shift correction amount) by the DVD signal level acquiring and storing section, the DVD ratio calculating section, the DVD lens shift correction amount calculating section, and the DVD lens shift section are reflected. The DVD sum signal/focus error signal acquiring section of the system controller 20 acquires a sum signal and the focus error signal from the detection signals A, B, C, and D with the CD laser diode 362 turned off and the DVD laser diode 361 turned on.

In the period T3, the CD sum signal/focus error signal acquiring section of the system controller 20 reflects the results of processing (the lens shift correction amount) by the CD signal level acquiring and storing section, the CD ratio calculating section, the CD lens shift correction amount calculating section, and the CD lens shift section. The sum signal and the focus error signal are then acquired from the detection signals A, B, C, and D with the DVD laser diode 361 turned off and the CD laser diode 362 turned on.

In the period T4D, the results of processing (the lens shift correction amount) by the DVD signal level acquiring and storing section, the DVD ratio calculating section, the DVD lens shift correction amount calculating section, and the DVD lens shift section are not reflected. When it is determined that an inserted disc is a DVD because the level of the sum signal acquired by the DVD sum signal/focus error signal acquiring section is larger than the level of the sum signal acquired by the CD sum signal/focus error signal acquiring section, the DVD signal level adjusting section of the system controller 20 individually adjusts the levels of the detection signals A, B, C, and D to all be the same level by adjusting the gain of the RF amplifier 5 with the CD laser diode 362 turned off and the DVD laser diode 361 turned on. Further, in the period T4D, the system controller 20 makes the gain of the focus error detection circuit 12 high, raises the level of the focus error signal up to the target level, and carries out a search operation.

In the period T4C, the results of processing (the lens shift correction amount) by the CD signal level acquiring and storing section, the CD ratio calculating section, the CD lens shift correction amount calculating section, and the CD lens shift section are reflected. When it is determined that an inserted disc is a CD because the level of the sum signal acquired by the CD sum signal/focus error signal acquiring section is larger than the level of the sum signal acquired by the DVD sum signal/focus error signal acquiring section, the CD signal level adjustment section of the system controller 20 individually adjusts the levels of the detection signals A, B, C, and D to all be the same level by adjusting the gain of the RF amplifier 5 with the DVD laser diode 361 turned off and the CD laser diode 362 turned on. Further, in the period T4C, the system controller 20 makes the gain of the focus error detection circuit 12 high, raises the level of the focus error signal up to the target level, and carries out a search operation.

In the period T5D, the results of processing (the lens shift correction amount) by the DVD signal level acquiring and storing section, the DVD ratio calculating section, the DVD lens shift correction amount calculating section, and the DVD lens shift section are reflected. The DVD S-shaped signal balance adjustment/focus pulling-in setting section of the system controller 20 carries out S-shaped signal balance adjustment and setting of focus pulling-in in order to pull in the focus servo for the focus error signal that is acquired, with the CD laser diode 362 turned off and the DVD laser diode 361 turned on.

In the period T5C, the results of processing (the lens shift correction amount) by the CD signal level acquiring and storing section, the CD ratio calculating section, the CD lens shift correction amount calculating section, and the CD lens shift section are reflected. The CD S-shaped signal balance adjustment/focus pulling-in setting section of the system controller 20 carries out S-shaped signal balance adjustment and setting of focus pulling-in in order to pull in the focus servo for the focus error signal that is acquired, with the DVD laser diode 361 turned off and the CD laser diode 362 turned on. In a period T6D, the focus-on state is achieved for the DVD. In a period T6C, the focus-on state is achieved for the CD.

According to the third embodiment, the system controller 20 carries out an additional search operation that is an operation for acquiring the detection signals A, B, C, and D of the photodetector 37 by moving the objective lens 33 upwards with the CD laser diode 362 turned off and the DVD laser diode 361 turned on, and acquires the levels of the detection signals A, B, C, and D. After this, the ratio α in the direction of the X-axis is calculated, and the lens shift correction amount resulting from the added search operation is adopted only when the ratio α is larger than the predetermined value. It is therefore possible to alleviate detracking at the time of a search operation by detecting an amount of deviation of light received by the light-receiving regions a, b, c, and d of the photodetector 37 in the direction of the X-axis, moving the objective lens 33 in a direction canceling this deviation, and making correction. As a result, reproduction quality for the DVD is increased.

Further, the system controller 20 carries out an additional search operation that is an operation for acquiring the detection signals A, B, C, and D of the photodetector 37 by moving the objective lens 33 upwards with the DVD laser diode 361 turned off and the CD laser diode 362 turned on, and acquires the levels of the detection signals A, B, C, and D. After this, the ratio α in the direction of the X-axis is calculated, and the lens shift correction amount resulting from the added search operation is adopted only when the ratio α is larger than the predetermined value. It is therefore possible to alleviate detracking at the time of a search operation by detecting an amount of deviation of light received by the light-receiving regions a, b, c, and d of the photodetector 37 in the direction of the X-axis, moving the objective lens 33 in a direction canceling this deviation, and making correction. As a result, reproduction quality for the CD is increased.

What is claimed is:

1. Optical disc reproduction apparatus comprising:
a photodetector divided into four light-receiving regions of a first quadrant light-receiving region, a second quadrant light-receiving region, a third quadrant light-receiving region, and a fourth quadrant light-receiving region by an X-axis and a Y-axis in X-Y coordinates when a radial direction of an optical disc is taken to be the X-axis and a track direction of the optical disc is taken to be the Y-axis;
an optical pick-up for irradiating laser light from a DVD (Digital Versatile Disc) laser diode or a CD (Compact Disc) laser diode onto the optical disc via an objective lens, receiving light reflected from the optical disc at the photodetector, and outputting first, second, third, and fourth detection signals of the first, second, third, and fourth quadrant light-receiving regions, respectively;
a tracking servo section for shifting the objective lens in the radial direction of the optical disc;
a focus servo section for shifting the objective lens in a vertical direction with respect to a recording surface of the optical disc; and
a moving section for moving the optical pick-up in the radial direction of the optical disc,
wherein the optical disc reproduction apparatus further comprises a system controller, the system controller comprising:
a DVD signal level acquiring and storing section for moving the objective lens upwards with the CD laser diode turned off and the DVD laser diode turned on, and acquiring levels of the first, second, third, and fourth detection signals from the photodetector for storage in a memory;
a DVD ratio calculating section for calculating a ratio (A+D)/(B+C) in a direction of the X-axis when the levels of the first, second, third, and fourth detection signals stored in the memory are taken to be A, B, C, and D, respectively;
a DVD lens shift correction amount calculating section for calculating a lens shift correction amount for the calculated ratio based on a correction table indicating a relationship of the ratio and the lens shift correction amount when the calculated ratio exceeds a predetermined value; and
a DVD lens shift section for controlling the tracking servo section in accordance with the lens shift correction amount that is calculated so as to shift the objective lens in the direction of the X-axis when the calculated ratio exceeds the predetermined value,
wherein the system controller executes processing provided by said sections included therein and reflects results in a succeeding series of processes required for achieving a focus-on state.

2. The optical disc reproduction apparatus of claim 1, wherein the system controller further comprises:
a DVD sum signal/focus error signal acquiring section for acquiring a DVD sum signal (A+B+C+D) for the first, second, third, and fourth detection signals and a DVD focus error signal (A+C)−(B+D) with the CD laser diode turned off and the DVD laser diode turned on, after reflecting results of processing by the DVD signal level acquiring and storing section, the DVD ratio calculating section, the DVD lens shift correction amount calculating section, and the DVD lens shift section;
a CD sum signal/focus error signal acquiring section for acquiring a CD sum signal for the first, second, third, and fourth detection signals and a CD focus error signal with the DVD laser diode turned off and the CD laser diode turned on;
a DVD signal level adjusting section for individually adjusting the levels of the signals A, B, C, and D with the CD laser diode turned off and the DVD laser diode turned on to all be the same level when it is determined that an inserted disc is a DVD because a level of the DVD sum signal is larger than a level of the CD sum signal, after reflecting the results of processing by the DVD signal level acquiring and storing section, the DVD ratio calculating section, the DVD lens shift correction amount calculating section, and the DVD lens shift section; and
a DVD S-shaped signal balance adjustment/focus pulling-in setting section for performing S-shaped signal balance adjustment of the DVD focus error signal and setting focus pulling-in in order to pull in a focus servo with the CD laser diode turned off and the DVD laser diode turned on, after reflecting the results of processing by the DVD signal level acquiring and storing section, the DVD ratio calculating section, the DVD lens shift correction amount calculating section, and the DVD lens shift section.

3. Optical disc reproduction apparatus comprising:

a photodetector divided into four light-receiving regions of a first quadrant light-receiving region, a second quadrant light-receiving region, a third quadrant light-receiving region, and a fourth quadrant light-receiving region by an X-axis and a Y-axis in X-Y coordinates when a radial direction of an optical disc is taken to be the X-axis and a track direction of the optical disc is taken to be the Y-axis;

an optical pick-up for irradiating laser light from a DVD laser diode or a CD laser diode onto the optical disc via an objective lens, receiving light reflected from the optical disc at the photodetector, and outputting first, second, third, and fourth detection signals of the first, second, third, and fourth quadrant light-receiving regions, respectively;

a tracking servo section for shifting the objective lens in the radial direction of the optical disc;

a focus servo section for shifting the objective lens in a vertical direction with respect to a recording surface of the optical disc; and a moving section for moving the optical pick-up in the radial direction of the optical disc, wherein the optical disc reproduction apparatus further comprises a system controller, the system controller comprising:

a CD signal level acquiring and storing section for moving the objective lens upwards with the DVD laser diode turned off and the CD laser diode turned on, and acquiring levels of the first, second, third, and fourth detection signals from the photodetector for storage in the memory;

a CD ratio calculating section for calculating a ratio (A+D)/(B+C) in a direction of the X-axis when the levels of the first, second, third, and fourth detection signals stored in the memory are taken to be A, B, C, and D, respectively;

a CD lens shift correction amount calculating section for calculating a lens shift correction amount for a calculated ratio based on a correction table indicating a relationship of the ratio and the lens shift correction amount when the calculated ratio exceeds a predetermined value; and a CD lens shift section for controlling the tracking servo section in accordance with the lens shift correction amount that is calculated so as to shift the objective lens in the direction of the X-axis when the calculated ratio exceeds the predetermined value, wherein the system controller executes processing provided by said sections included therein and reflects results in a succeeding series of processes required for achieving a focus-on state.

4. The optical disc reproduction apparatus of claim 3, wherein the system controller further comprises:

a DVD sum signal/focus error signal acquiring section for acquiring a DVD sum signal (A+B+C+D) for the first, second, third, and fourth detection signals and a DVD focus error signal (A+C)−(B+D) with the CD laser diode turned off and the DVD laser diode turned on;

a CD sum signal/focus error signal acquiring section for acquiring a CD sum signal for the first, second, third, and fourth detection signals and a CD focus error signal with the DVD laser diode turned off and the CD laser diode turned on, after reflecting results of processing by the CD signal level acquiring and storing section, the CD ratio calculating section, the CD lens shift correction amount calculating section, and the CD lens shift section;

a CD signal level adjusting section for individually adjusting the levels of the signals A, B, C, and D with the DVD laser diode turned off and the CD laser diode turned on to all be the same level when it is determined that an inserted disc is a CD because a level of the CD sum signal is larger than a level of the DVD sum signal, after reflecting the results of processing by the CD signal level acquiring and storing section, the CD ratio calculating section, the CD lens shift correction amount calculating section, and the CD lens shift section; and a CD S-shaped signal balance adjustment/focus pulling-in setting section for performing S-shaped signal balance adjustment of the CD focus error signal and setting focus pulling-in in order to pull in a focus servo with the DVD laser diode turned off and the CD laser diode turned on, after reflecting the results of processing by the CD signal level acquiring and storing section, the CD ratio calculating section, the CD lens shift correction amount calculating section, and the CD lens shift section.

5. Optical disc reproduction apparatus comprising:

a photodetector divided into four light-receiving regions of a first quadrant light-receiving region, a second quadrant light-receiving region, a third quadrant light-receiving region, and a fourth quadrant light-receiving region by an X-axis and a Y-axis in X-Y coordinates when a radial direction of an optical disc is taken to be the X-axis and a track direction of the optical disc is taken to be the Y-axis;

an optical pick-up for irradiating laser light from a DVD laser diode or a CD laser diode onto the optical disc via an objective lens, receiving light reflected from the optical disc at the photodetector, and outputting first, second, third, and fourth detection signals of the first, second, third, and fourth quadrant light-receiving regions, respectively;

a tracking servo section for shifting the objective lens in the radial direction of the optical disc;

a focus servo section for shifting the objective lens in a vertical direction with respect to a recording surface of the optical disc; and a moving section for moving the optical pick-up in the radial direction of the optical disc, wherein the optical disc reproduction apparatus further comprises a system controller, the system controller comprising:

a DVD signal level acquiring and storing section for moving the objective lens upwards with the CD laser diode turned off and the DVD laser diode turned on, and acquiring levels of the first, second, third, and fourth detection signals for DVD use from the photodetector for storage in the memory;

a DVD ratio calculating section for calculating a ratio (A+D)/(B+C) for DVD use in a direction of the X-axis when the levels of the first, second, third, and fourth detection signals for DVD use stored in the memory are taken to be A, B, C, and D, respectively;

a DVD lens shift correction amount calculating section for calculating a lens shift correction amount for the calculated ratio for DVD use based on a correction table indicating a relationship of the calculated ratio for DVD use and the lens shift correction amount for DVD use when the calculated ratio exceeds a predetermined value;

a DVD lens shift section for controlling the tracking servo section in accordance with the lens shift correction amount for DVD use that is calculated so as to shift the objective lens in the direction of the X-axis when the calculated ratio for DVD use exceeds the predetermined value;

a CD signal level acquiring and storing section for moving the objective lens upwards with the DVD laser diode turned off and the CD laser diode turned on, and acquiring the levels of the first, second, third and fourth detection signals from the photodetector for storage in the memory;

a CD ratio calculating section for calculating a ratio (A+D)/(B+C) for CD use in the direction of the X-axis when the levels of the first, second, third, and fourth detection signals for CD use stored in the memory are taken to be A, B, C, and D, respectively;

a CD lens shift correction amount calculating section for calculating a lens shift correction amount for the calculated ratio for CD use based on a correction table indicating a relationship of the calculated ratio for CD use and a lens shift correction amount for CD use when the calculated ratio exceeds a predetermined value; and a CD lens shift section for controlling the tracking servo section in accordance with the lens shift correction amount for CD use that is calculated so as to shift the objective lens in the direction of the X-axis when the calculated ratio for CD use exceeds the predetermined value, wherein the system controller executes processing provided by said sections included therein and reflects results in a succeeding series of processes required for achieving a focus-on state.

6. The optical disc reproduction apparatus of claim 5, wherein the system controller further comprises:

a DVD sum signal/focus error signal acquiring section for acquiring a DVD sum signal (A+B+C+D) for the first, second, third, and fourth detection signals and a DVD focus error signal (A+C)−(B+D) with the CD laser diode turned off and the DVD laser diode turned on, after reflecting results of processing by the DVD signal level acquiring and storing section, the DVD ratio calculating section, the DVD lens shift correction amount calculating section, and the DVD lens shift section;

a CD sum signal/focus error signal acquiring section for acquiring a CD sum signal for the first, second, third, and fourth detection signals and a CD focus error signal with the DVD laser diode turned off and the CD laser diode turned on, after reflecting results of processing by the CD signal level acquiring and storing section, the CD ratio calculating section, the CD lens shift correction amount calculating section, and the CD lens shift section;

a DVD signal level adjusting section for individually adjusting the levels of the signals A, B, C, and D so as to all become the same level with the CD laser diode turned off and the DVD laser diode turned on when it is determined that an inserted disc is a DVD because a level of the DVD sum signal acquired by the DVD sum signal/focus error signal acquiring section is larger than a level of the CD sum signal acquired by the CD sum signal/focus error signal acquiring section;

a CD signal level adjusting section for individually adjusting the levels of the signals A, B, C, and D to all be the same level with the DVD laser diode turned off and the CD laser diode turned on when it is determined that the inserted disc is a CD because the level of the CD sum signal is greater than the level of the DVD sum signal;

a DVD S-shaped signal balance adjustment/focus pulling-in setting section for performing S-shaped signal balance adjustment of the DVD focus error signal and setting focus pulling-in in order to pull in a focus servo with the CD laser diode turned off and the DVD laser diode turned on, after reflecting the results of processing by the DVD signal level acquiring and storing section, the DVD ratio calculating section, the DVD lens shift correction amount calculating section, and the DVD lens shift section; and a CD S-shaped signal balance adjustment/focus pulling-in setting section for performing S-shaped signal balance adjustment of the CD focus error signal and setting focus pulling-in in order to pull in a focus servo with the DVD laser diode turned off and the CD laser diode turned on, after reflecting the results of processing by the CD signal level acquiring and storing section, the CD ratio calculating section, the CD lens shift correction amount calculating section, and the CD lens shift section.

* * * * *